US010083109B2

(12) United States Patent
Wei

(10) Patent No.: US 10,083,109 B2
(45) Date of Patent: Sep. 25, 2018

(54) TESTING A BROWSER-BASED APPLICATION

(71) Applicant: International Business Machines Corporation, Armonk, NY (US)

(72) Inventor: Qun Wei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/398,900

(22) Filed: Jan. 5, 2017

(65) Prior Publication Data

US 2017/0116107 A1   Apr. 27, 2017

Related U.S. Application Data

(63) Continuation of application No. 14/879,120, filed on Oct. 9, 2016, now Pat. No. 9,582,404, which is a
(Continued)

(30) Foreign Application Priority Data

May 31, 2011   (CN) .......................... 2011 1 0144956

(51) Int. Cl.
*G06F 15/16*   (2006.01)
*G06F 11/36*   (2006.01)
(Continued)

(52) U.S. Cl.
CPC .............. *G06F 11/368* (2013.01); *G06F 8/71* (2013.01); *G06F 11/3664* (2013.01); *G06F 11/3688* (2013.01); *H04L 67/02* (2013.01)

(58) Field of Classification Search
USPC .......... 709/203; 707/754; 715/234; 714/38.1
See application file for complete search history.

(56) References Cited

U.S. PATENT DOCUMENTS 4,199,793 A * 4/1980 Baldwin .............. G11B 5/4893
    360/130.21
5,907,836 A * 5/1999 Sumita ................ G06F 17/3061
    707/754
(Continued)

FOREIGN PATENT DOCUMENTS

CN    1179576    4/1998
CN    1295292    5/2001
(Continued)

OTHER PUBLICATIONS

Response filed Nov. 20, 2013 for U.S. Appl. No. 13/456,306, filed Apr. 26, 2012, First Named Inventor: Qun Wei.
(Continued)

*Primary Examiner* — Tammy Nguyen
(74) *Attorney, Agent, or Firm* — Schmeiser, Olsen & Watts, LLP; John Pivnichny

(57) ABSTRACT

A method and system for testing multiple language versions of a browser-based application. A host language Hypertext Transfer Protocol (HTTP) request issued by a host language browser is received. The host language HTTP request is configured to be sent to a host server address. The host language HTTP request comprises parameter strings in a host language. A target language HTTP request is generated by replacing each host parameter string of at least one host parameter string of the parameter strings in the received HTTP request with a respective target parameter string associated with a target language that differs from the host language. The generated target language HTTP request is configured to be sent to a target server address associated with and different from the host server address.

20 Claims, 3 Drawing Sheets

Related U.S. Application Data continuation of application No. 13/456,270, filed on Apr. 26, 2012, now Pat. No. 9,235,568.

(51) Int. Cl.
  *G06F 8/71* (2018.01)
  *H04L 29/08* (2006.01)

(56) References Cited

U.S. PATENT DOCUMENTS

| | | | |
|---|---|---|---|
| 6,070,149 A | 5/2000 | Tavor et al. | |
| 6,204,885 B1* | 3/2001 | Kwoh | H04N 5/445 348/468 |
| 6,530,039 B1 | 3/2003 | Yang | |
| 6,708,137 B2* | 3/2004 | Carley | H04L 41/142 702/179 |
| 6,889,231 B1 | 5/2005 | Souder et al. | |
| 7,031,974 B1 | 4/2006 | Subramaniam | |
| 7,543,189 B2 | 6/2009 | Fichter et al. | |
| 7,680,668 B2 | 3/2010 | Voruganti | |
| 7,750,913 B1* | 7/2010 | Parenteau | G06T 15/005 345/426 |
| 8,073,773 B2 | 12/2011 | Kozee et al. | |
| 8,166,406 B1 | 4/2012 | Goldfeder et al. | |
| 9,201,872 B2 | 12/2015 | Wei | |
| 9,235,568 B2 | 1/2016 | Wei | |
| 2003/0018450 A1 | 1/2003 | Carley | |
| 2003/0074481 A1* | 4/2003 | Fox | G06F 17/30905 719/310 |
| 2003/0195852 A1* | 10/2003 | Campbell | G06F 21/10 705/51 |
| 2004/0230898 A1* | 11/2004 | Blakely | G06F 17/218 715/234 |
| 2005/0273861 A1 | 7/2005 | Chess et al. | |
| 2005/0273854 A1 | 12/2005 | Chess et al. | |
| 2005/0273859 A1 | 12/2005 | Chess et al. | |
| 2005/0273860 A1 | 12/2005 | Chess et al. | |
| 2006/0136570 A1 | 6/2006 | Pandya | |
| 2008/0263529 A1 | 10/2008 | Beretta | |
| 2008/0281872 A1* | 11/2008 | Mizuno | G11B 27/034 |
| 2009/0048997 A1 | 2/2009 | Manickam et al. | |
| 2010/0057439 A1* | 3/2010 | Ideuchi | G06F 17/273 704/7 |
| 2010/0204977 A1* | 8/2010 | Chiu | G06F 17/275 704/2 |
| 2011/0145652 A1* | 6/2011 | Sukendro | G06F 9/453 714/38.1 |
| 2012/0054143 A1 | 3/2012 | Doig et al. | |
| 2012/0310625 A1 | 12/2012 | Wei | |
| 2012/0311625 A1* | 12/2012 | Nandi | H04N 21/23418 725/28 |
| 2012/0315610 A1* | 12/2012 | Listim | G09B 1/06 434/171 |
| 2013/0090914 A1* | 4/2013 | White | G06F 17/28 704/2 |
| 2013/0290403 A1 | 10/2013 | Wei | |
| 2015/0073773 A1* | 3/2015 | Acevedo Arizpe | G06F 17/30705 704/9 |
| 2016/0034376 A1 | 2/2016 | Wei | |
| 2016/0034377 A1 | 2/2016 | Wei | |
| 2017/0109355 A1* | 4/2017 | Li | G06F 17/3053 |

FOREIGN PATENT DOCUMENTS

| | | |
|---|---|---|
| CN | 1477553 | 2/2004 |
| CN | 101583072 | 11/2009 |

OTHER PUBLICATIONS

Office Action (dated Aug. 21, 2013) for U.S. Appl. No. 13/456,306, filed Apr. 26, 2012, First Named Inventor: Qun Wei.
Office Action (dated Feb. 28, 2014) for U.S. Appl. No. 13/456,306, filed Apr. 26, 2012.
Amendment (filed May 27, 2014) for U.S. Appl. No. 13/456,306, filed Apr. 26, 2012.
CN Office action dated Jun. 30, 2014, PN111679, 7 pages.
Final Office Action (dated Dec. 15, 2014) for U.S. Appl. No. 13/456,306, filed Apr. 26, 2012.
Notice of Appeal (Feb. 11, 2015) for U.S. Appl. No. 13/456,306, filed Apr. 26, 2012, Conf. No. 1029.
Appeal Brief (Mar. 17, 2015) for U.S. Appl. No. 13/456,306, filed Apr. 26, 2012, Conf. No. 1029.
Notice of Allowance (dated Jul. 20, 2015) for U.S. Appl. No. 13/456,270, filed Apr. 26, 2012, Conf. No. 1070.
312 amendment (Aug. 26, 2015) for U.S. Appl. No. 13/456,270, filed Apr. 26, 2012, Conf. No. 1070.
Appeal Brief (Feb. 20, 2015) for U.S. Appl. No. 13/456,270, filed Apr. 26, 2012, Conf. No. 1070.
Notice of Appeal (Dec. 23, 2014) for U.S. Appl. No. 13/456,270, filed Apr. 26, 2012, Conf. No. 1070.
Advisory Action (dated Dec. 22, 2014) for U.S. Appl. No. 13/456,270, filed Apr. 26, 2012, Conf. No. 1070.
Final Amendment (Nov. 18, 2014) for U.S. Appl. No. 13/456,270, filed Apr. 26, 2012, Conf. No. 1070.
Final Office Action (dated Sep. 25, 2014) for U.S. Appl. No. 13/456,270, filed Apr. 26, 2012, Conf. No. 1070.
Amendment (Jun. 2, 2014) for U.S. Appl. No. 13/456,270, filed Apr. 26, 2012, Conf. No. 1070.
Office Action (dated Mar. 4, 2014) for U.S. Appl. No. 13/456,270, filed Apr. 26, 2012, Conf. No. 1070.
Amendment (Nov. 20, 2013) for U.S. Appl. No. 13/456,270, filed Apr. 26, 2012, Conf. No. 1070.
Office Action (dated Sep. 6, 2013) for U.S. Appl. No. 13/456,270, filed Apr. 26, 2012, Conf. No. 1070.
Notice of Allowance (dated Jul. 22, 2015) for U.S. Appl. No. 13/456,306, filed Apr. 26, 2012, Conf. No. 1029.
Office Action (dated May 20, 2016) for application No. CN920110042US3, filed Oct. 9, 2015, Application No. CN920110042US3.
Amendment (Aug. 19, 2016) for application No. CN920110042US3, filed Oct. 9, 2015, Application No. CN920110042US3.
Office Action (dated May 23, 2016) for U.S. Appl. No. 14/879,147, filed Oct. 9, 2015, Conf. No. 7335.
Amendment (Aug. 22, 2016) for U.S. Appl. No. 14/879,147, filed Oct. 9, 2015, Conf. No. 7335.
Notice of Allowance (dated Jan. 18, 2017) for application No. CN920110042US3, filed Oct. 9, 2015, Application No. CN920110042US3.
Notice of Allowance (dated Oct. 19, 2016) for U.S. Appl. No. 14/879,147, filed Oct. 9, 2015, Conf. No. 7335.

* cited by examiner

TESTING A BROWSER-BASED APPLICATION

This application is a continuation application claiming priority to Ser. No. 14/879,120, filed Oct. 9, 2015, now U.S. Pat. No. 9,582,404, issued Feb. 28, 2017, which a continuation application to Ser. No. 13/456,270 filed Apr. 26, 2012, U.S. Pat. No. 9,235,568, issued Jan. 12, 2016.

TECHNICAL FIELD

The present invention relates generally to the testing of an application and more particularly, to a method and system for testing a browser-based application.

BACKGROUND

With the development of Web technology currently, many Web applications are implemented based on the browser/server (B/S) architecture. Different from the conventional client/server (C/S) architecture, the B/S architecture only requires a browser and does not need to install specialized software. It is convenient to work on different platforms by interacting with the Web server through the browser. In order to be adapted to the Internet environment, currently many Web applications have different language versions. Currently, there is not a simple and quick method for international testing of Web application products; and if a conventional software testing method is used, with the increase of supported languages, the workload of testing will also increases exponentially. Therefore, there is a need for a method for quickly and efficiently performing international testing of a Web application product.

BRIEF SUMMARY

The present invention provides a method for testing multiple language versions of a browser-based application, said method comprising:

a processor of a computer system receiving a host language Hypertext Transfer Protocol (HTTP) request issued by a host language browser, said host language HTTP request configured to be sent to a host server address, said HTTP request comprising a plurality of parameter strings in a host language; and said processor generating a target language HTTP request by replacing each host parameter string of at least one host parameter string of the plurality of parameter strings in the received HTTP request with a respective target parameter string associated with a target language that differs from the host language, said generated target language HTTP request configured to be sent to a target server address associated with and different from the host server address.

DETAILED DESCRIPTION

Figure 1:
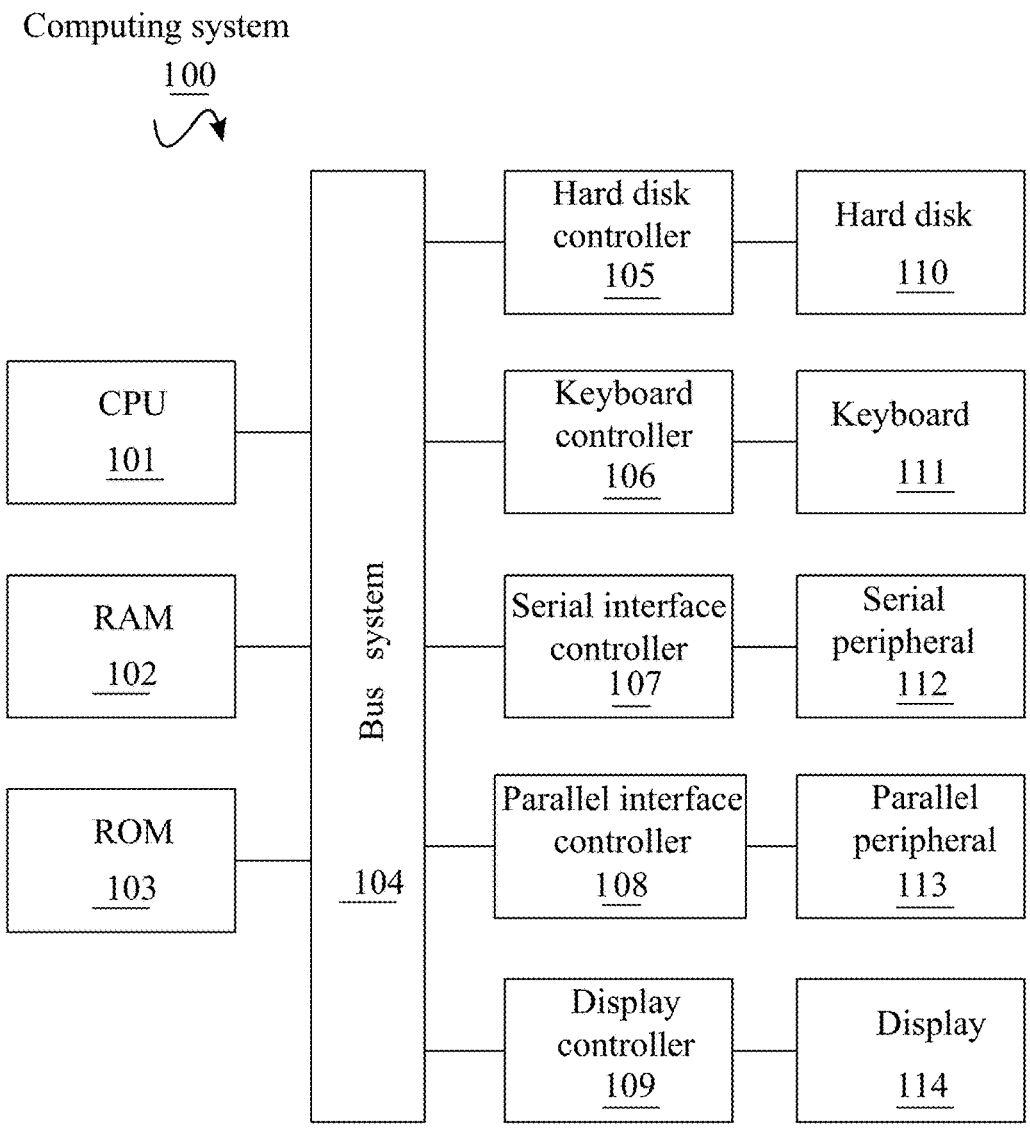
FIG. 1 shows a block diagram of an exemplary computing system suitable for realizing implementations of the present invention.

The present invention provides a method for testing a browser-based application, comprising: receiving a host language Hypertext Transfer Protocol (HTTP) request issued by a host language browser; obtaining globalization rules; modifying the host language HTTP request according to the globalization rules to generate a target language HTTP request; and instructing a target language browser to issue the generated target language HTTP request. In the above one or more embodiments provided by embodiments of the present invention, by modifying a host language HTTP request using globalization rules to generate a target language HTTP request and further instructing to issue the generated target language HTTP request, multiple language versions of the Web application can be tested concurrently, so as to greatly increase the testing efficiency, and enable fast and efficient international testing of the Web application product.

With the present invention, virtualization technology can be utilized to install web application servers of different languages on a plurality of virtual machines, to perform testing of multiple language versions of a Web application concurrently, so as to significantly increase the testing efficiency.

According to an embodiment of the present invention, there is provided a method for testing a browser-based application, comprising: receiving a host language HTTP request issued by a host language browser; obtaining globalization rules; modifying the host language HTTP request according to the globalization rules to generate a target language HTTP request; and instructing the target language browser to issue the generated target language HTTP request.

According to an embodiment of the present invention, a system for testing a browser-based application is provided, comprising: a request receiver configured to receive a host language HTTP request issued by a host language browser; a rule obtainer configured to obtain globalization rules; a request modifier configured to modify the host language HTTP request according to the globalization rules to generate a target language HTTP request; and a request instructor configured to instruct the target language browser to issue the generated target language HTTP request.

In addition, an embodiment of the present invention also provides a computer program product corresponding to the above method.

In the above one or more embodiments provided by the embodiments of the present invention, by using globalization rules to modify a host language HTTP request to generate a target language HTTP request and further instruct to issue the generated the target language HTTP request, concurrent testing can be performed on multiple languages versions of the Web application, so as to greatly increase the testing efficiency and to enable fast and efficient international testing of the Web application product.

In the following description of the present invention, exemplary embodiments of the present disclosure are described in conjunction with the accompanying drawings. For clarity and simplicity, not all the features of actual implementation are described in the description. However, it should be appreciated that many decisions specific to the actual implementations must be made during developing the actual embodiments, so as to realize specific objectives; e.g., complying with the constraints related to the system and business, which constraints may vary with different implementations.

FIG. 1 shows a block diagram of an exemplary computer system 100 suitable for realizing implementations of the present invention. As shown in FIG. 1, the computer system 100 may include: a CPU (central processing unit) 101, a RAM (random access memory) 102, a ROM (read only memory) 103, a system bus 104, a hard disk controller 105, a keyboard controller 106, a serial interface controller 107, a parallel interface controller 108, a display controller 109, a hard disk 110, a keyboard 111, a serial peripheral device 112, a parallel peripheral device 114 and a display 114. In these devices, what are coupled with the system bus 104 are the CPU 101, the RAM 102, the ROM 103, the hard disk controller 105, the keyboard controller 106, the serial controller 107, the parallel controller 108 and the display controller 109. The hard disk 110 is coupled with the hard disk controller 105, the keyboard 111 is coupled with the keyboard controller 106, the serial peripheral device 12 is coupled with the serial interface controller 107, the parallel peripheral device 113 is coupled with the parallel interface controller 108, and the display 114 is coupled with the display controller 109.

Thus, the computer system 100 invention may comprise a processor (e.g., CPU 101), a memory (e.g., RAM 102) coupled to the processor, and a computer readable storage device (e.g., hard disk 110 in FIG. 1, floppy disk, removable media, flash memory, a "memory stick", optical media, magneto-optical media, CD-ROM, etc. coupled to the processor. The storage device contains program code configured to be executed by the processor via the memory to implement the methods of the present invention.

In one embodiment, the present invention may take the form of a computer program product comprising one or more physically tangible (e.g., hardware) computer readable storage medium(s) or devices having computer readable program code stored therein. The program code is configured to be executed by a processor of a computer system implement the methods of the present invention. In one embodiment, the physically tangible computer readable medium(s) and/or device(s) (e.g., hardware media and/or devices) that store the program code which implement methods of the present invention do not comprise a signal generally, or a transitory signal in particular.

It should be appreciated that the structural block diagram of FIG. 1 is shown only for illustrative purpose, rather than limitation to the scope of the present invention. In some cases, some devices may be added or removed according to specific conditions.

Figure 2:
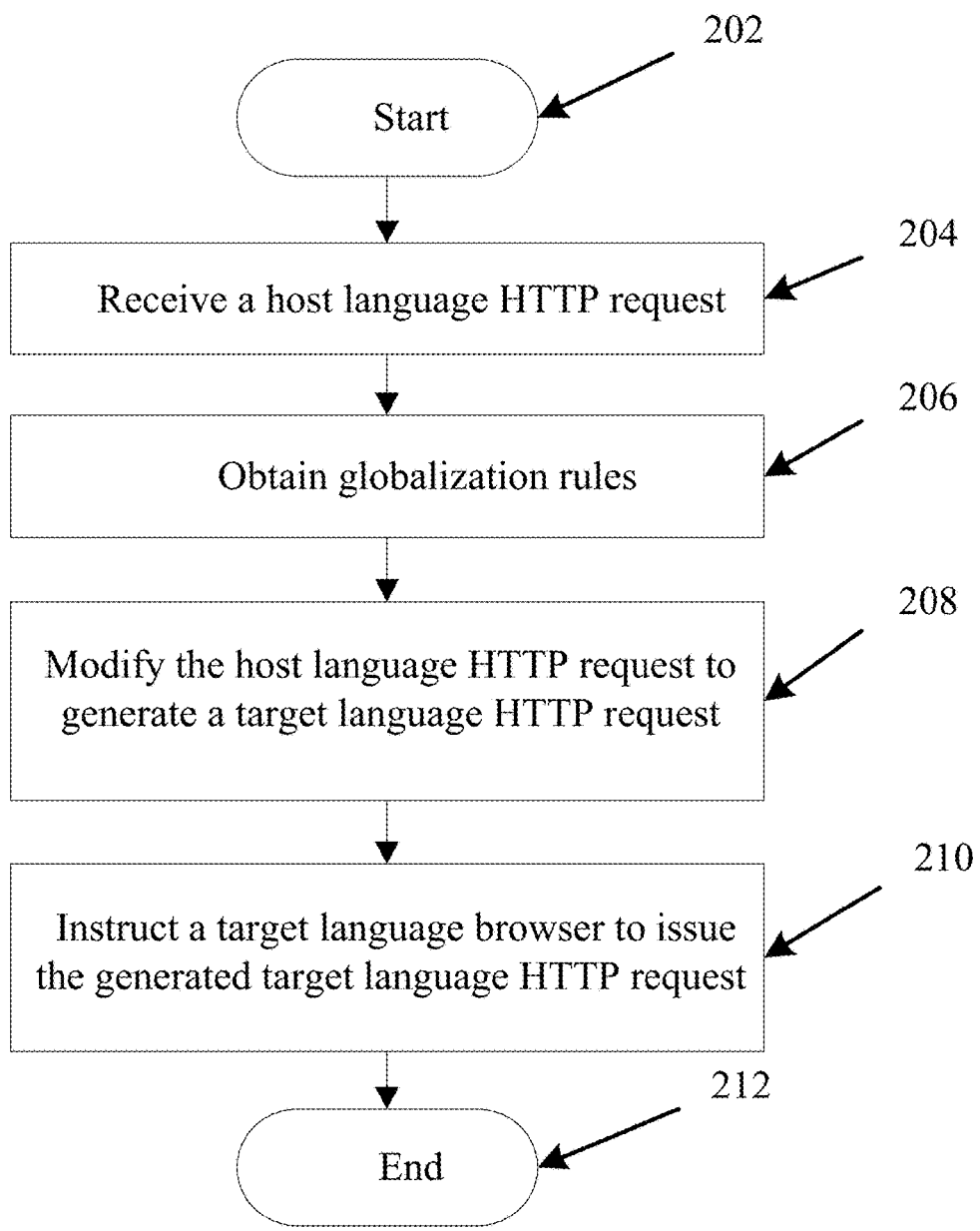
FIG. 2 shows a flow chart of method for testing a browser-based application according to an embodiment of the present invention.

FIG. 2 shows a flowchart of a method 200 for testing a browser-based application according to an embodiment of the present invention. As shown in FIG. 2, the method 200 for testing a browser-based application starts at step 202.

Next, the method 200 enters into step 204, in which a host language HTTP request issued by the host language browser is received. The host language HTTP request is configured to be sent to a host server address and the HTTP request comprises a plurality of parameter strings in a host language. The host language HTTP request is a HTTP request issued by the tester performing the globalization testing through the host language browser he/she operates. The host language browser can have, e.g., English interface, that is, the host language is English. The host language browser operated by the tester receives a user input and generates a host language HTTP request. The following gives an example of a generated host language HTTP request.

```
GET
/SampleWeb/javax.faces.resource/sample.jsf?Stringname=
Create+User&Date=07%2D01
%2D2011 HTTP/1.1
Accept-Language: en-us
```

-continued

```
User-Agent: Mozilla/4.0
Host: 9.125.139.100
Connection: Keep-Alive
```

Next, the method 200 enters into step 206, in which globalization rules are obtained. The globalization rules specify rules of correspondence between different language versions of a browser-based application. Table 1 presents an example of the globalization rules. It should be understood that Table 1 only exemplarily shows part of the rules, and the rules shown in Table 1 are only exemplary illustration, and should not be taken as limitation to the technical solutions of the present disclosure. For different applications, the globalization rules may have different specific rules or forms.

TABLE 1

| Language | en-us | zh-cn |
|---|---|---|
| Date format | mm-dd-yyyy | yyyy年mm月dd月 |
| Server address | 9.125.139.100 | 9.125.139.200 |
| String name | Create User | 创建用户 |
| String name | Network | 网络 |

Thus in one embodiment, globalization rules of correspondence between host parameter strings in the host language and corresponding target parameter strings associated with the target language are obtained. In the globalization rules, each host parameter string of the at least one host parameter string in the host language HTTP request is found. Then the respective target parameter string corresponding to each host parameter string found in the globalization rules is determined.

In one embodiment as depicted in the Language row in Table 1, a host language parameter string of the at least one host parameter string in the host language HTTP request may be the host language (e.g., en-us denoting English as depicted in Table 1), wherein the globalization rules specify that the target language (e.g., zh-cn denoting Chinese as depicted in Table 1) is the respective target parameter string corresponding to the host language parameter string.

In one embodiment as depicted in the server address row in Table 1, a host address parameter string of the at least one host parameter string in the host language HTTP request is the host server address, wherein the globalization rules specify that the target server address is the respective target parameter string corresponding to the host address parameter string.

In one embodiment as depicted in the date format row in Table 1, a date format parameter string of the at least one host parameter string in the host language HTTP request specifies a format for a month, day, and year of a date.

Next, method 200 enters into step 208, in which the host language HTTP request is modified according to the globalization rules to generate a target language HTTP request. In one embodiment, each host parameter string of the at least one host parameter string in the host language HTTP request is replaced with the respective target parameter string determined from the globalization rules.

According to an embodiment of the present invention, a host parameter string is extracted from the received host language HTTP request and replaced by a corresponding target parameter string. In one embodiment, the target language HTTP request is generated by replacing each host parameter string of at least one host parameter string of a plurality of parameter strings in the received HTTP request with a respective target parameter string associated with a target language that differs from the host language. The generated target language HTTP request is configured to be sent to a target server address associated with and different from the host server address.

According to an embodiment of the present invention, modifying the host language HTTP according to the globalization rules to generate a target language HTTP request comprises: searching for a corresponding parameter string in the target language, and replacing the parameter string in the host language HTTP request with the corresponding parameter string in the target language. According to an embodiment of the present disclosure, modifying the host language HTTP according to the globalization rules to generate a target language HTTP request comprises: searching for a corresponding data format in the target language, and replacing the corresponding parameter string in the host language HTTP request with the parameter string corresponding to the target language data format. By using the corresponding parameter string in the target language to replace the parameter string in the host language HTTP request or using the parameter string corresponding to the target language data format to replace the corresponding parameter string in the host language HTTP request, a target language HTTP request is generated.

In the following will be described the above process with reference to the host language HTTP request given previously as an example. According to an embodiment of the present invention, by analyzing the host language HTTP request, first it is determined that its language (i.e., the host language) is en-us; further, the parameter strings appearing in the host language HTTP request, i.e., "CreateUser" and "07-11-2011", are extracted. Further, by checking the globalization rules, it can be determined that there is target language zh-cn corresponding to the host language en-us. It should be appreciated that to simplify the description, Table 1 only shows one target language, Table 1 may have rules corresponding to multiple target languages, and for simplicity, here corresponding examples are not given. Further, by checking the globalization rules, it can be determined that the parameter string of the target language zh-cn to which the parameter string "CreateUser" corresponds is "创建用户". Then, the corresponding parameter string "创建用户" of the target language (zh-cn) is used to replace the corresponding parameter string "CreatUser" in the host language HTTP request. Further, for the parameter string "07-01-2011", by checking the globalization rules, it can be determined that the date format of the target language zh-ch corresponding to the date format of the host language en-us, "mm-dd-yyyy", is "yyyy年mm月dd日". Then the parameter string corresponding to the date format of the target language (zh-cn) is used to replace the corresponding parameter string in the host language HTTP. That is, using "2011年07月01日" to replace "07-01-2011". In the following is presented the target language HTTP request generated by the above process.

```
GET
/SampleWeb/javax.faces.resource/sample.jsf?Stringname=
%E5%88%9B%E5%BB%BA
%E7%94%A8%E6%88%B7&Date=
2011%E5%B9%B407%E6%9C%8801%E6%97%A
5 HTTP/1.1
Accept-Language: zh-cn
User-Agent: Mozilla/4.0
Host: 9.125.139.200
Connection: Keep-Alive
``` wherein "%E5%88%9B%E5%BB%BA%E7%94%A8%E6%88%B7" corresponds to the encoded "创建用户", while "2011%E5%B9%B407%E6%9C%8801%E6%97%A5" corresponds to the encoded "2011年07月01日".

Next, the method 200 enters into step 210, in which the target language browser is instructed to issue the generated target language HTTP request; e.g., by instructing the target language browser to send the target language HTTP request to the target server at the target serve address. After the above-described step 208, one or more target language HTTP requests have been generated from the host language HTTP request according to the globalization rules. Since an HTTP request can only be issued by a browser, according to an embodiment of the present disclosure, respective browsers corresponding to the target languages may further be instructed to issue corresponding target language HTTP requests, and further the respective browsers corresponding to the target languages may receive responses to the corresponding target language HTFP requests.

Next, the method 200 enters into step 212 and ends.

According to another embodime of the present invention, the method 200 for testing a browser-based application further comprises instructing the host language browser to issue a host language HTTP request. This step can be executed in response to receiving the host language HTTP request issued by the host language browser, or be executed in response to generating the target language HTTP request. Instructing the host language browser to issue the host language HTTP request can be realized by transparently processing the host language HTTP request, that is, directly sending the host language HTTP request to the host server at the host server address without any processing. In one embodiment, sending the host language HTTP request to a host server address and sending the target language HTTP request to a target server address are performed concurrently, for implementation of concurrent testing performed on multiple languages versions of a Web application.

According to another embodiment of the present invention, the method 200 for testing a browser-based application further comprises obtaining a response to the received host language HTTP request and a response to the target language HTTP request. In response to instructing the host language browser to issue the host language HTTP request and the target language browser to issue the target language HTTP request, the host language browser will receive the response to the host language HTTP request and display it on the host language browser, while the target language browser will receive the response to the target language HTTP request and display it on the target language browser. At this time, according to an embodiment of the present disclosure, by invoking interfaces provided by the browsers, the response to the received host language HTTP request and the response to the target language HTTP request can be obtained in response to the host language browser sending the host language HTTP request to the host server address and the target language browser sending the target language HTTP request to the target server address, respectively. Further, according to another embodiment of the present disclosure, the obtained response to the host language HTTP request and response to the target language HTTP request are compared and analyzed.

Above has been described a method for testing a browser-based application according to an embodiment of the present invention with reference to an example of an HTTP GET request. It should be pointed out that the above example is only for illustrative purpose, and should not be construed as limitation to the technical solution of the present disclosure. In fact, the technical solution of the present disclosure is also applicable to other types of HTTP request, e.g., HTTP POST, HTTP PUT, etc., which will not described here one by one.

In the following will be described a system for testing a browser-based application according to an embodiment of the present invention with reference to FIG. 3.

Figure 3:
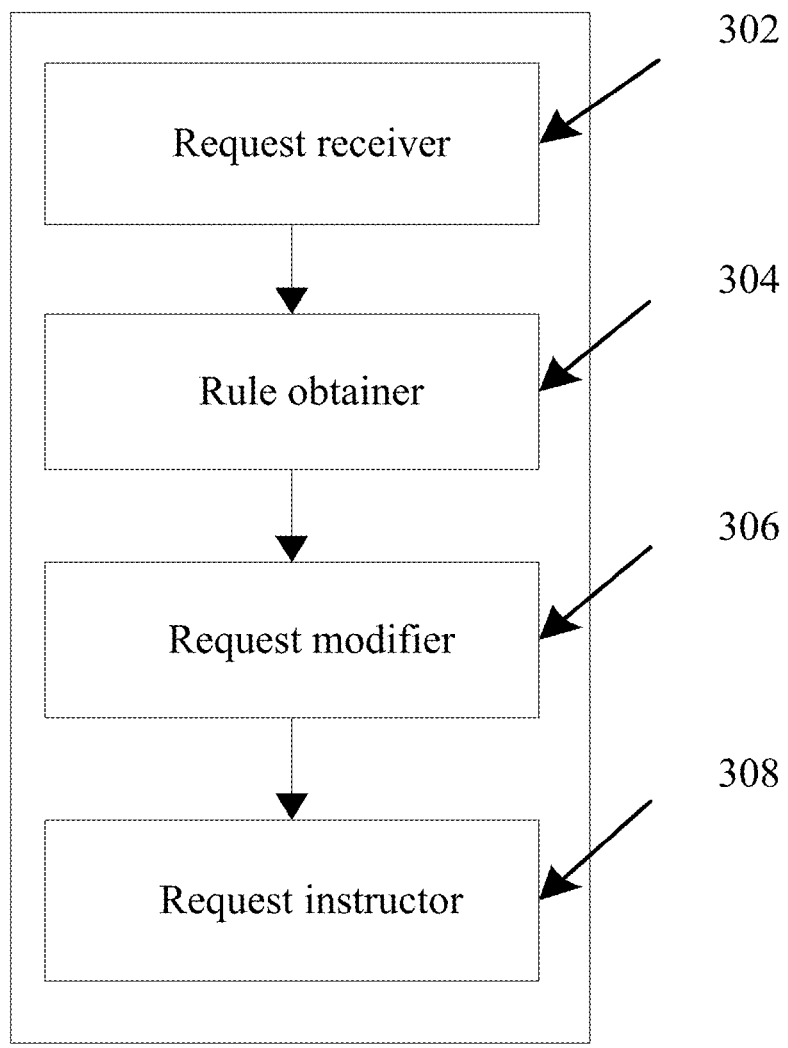
FIG. 3 shows a block diagram of a system for testing a browser-based application according to an embodiment of the present invention.

FIG. 3 shows a block diagram of a system 300 for testing a browser-based application according to an embodiment of the present invention. As shown in FIG. 3, the system 300 for testing a browser-based application comprises: a request receiver 302 configured to receive a host language HTTP request issued by the host language browser; a rule obtainer 304 configured to obtain globalization rules; a request modifier 306 configured to modify the host language HTTP request according to the globalization rules to generate a target language HTTP request; and a request instructor 308 configured to instruct the target language browser to issue the generated target language HTTP request. In the following will be described the respective components in greater detail.

The request receiver 302 is configured to receive a host language HTTP request issued by the host language browser. The host language HTTP request is an HTTP request issued by the tester performing the globalization test through the host language browser he/she operates. The host language browser can have, e.g., English interface, that is, the host language is English. The host language browser operated by the tester receives a user input and generates the host language HTTP request.

The rule obtainer 304 is configured to obtain globalization rules. The globalization rules specify the rules of correspondence between different language versions of the browser-based application.

The request modifier 306 is configured to modify the host language HTTP request according to the globalization rules to generate the host language HTTP request.

According to an embodiment of the present invention, the system 300 for testing a browser-based application further comprises a parameter extractor (not shown in FIG. 3) configured to extract a parameter string from the received host language HTTP request. According to an embodiment of the present invention, the request modifier 306 is further configured to search for a corresponding parameter string in the target language, and replace the parameter string in the host language HTTP request with the corresponding parameter string in the target language. According to an embodiment of the present invention, the request modifier 306 is further configured to search for a corresponding data format in the target language, and replace a corresponding parameter string in the host language HTTP request with a parameter string corresponding to target language data format. By using the corresponding parameter string in the target language to replace the parameter string in the host language HTTP request or using the parameter string corresponding to the target language data format to replace a corresponding parameter string in the host language HTTP request, a target language HTTP request is generated.

The request instructor 308 is configured to instruct the target language browser to issue the generated target language HTTP request. According to an embodiment of the present invention, the request instructor 308 is configured to instruct a respective browser corresponding to a target language to issue a corresponding target language HTTP request.

According to another embodiment of the present invention, the request instructor 308 is further configured to instruct the host language browser to issue the host language HTTP request. This can be performed in response to receiving the host language HTTP request issued by the host language browser, or performed in response to generating the host language HTTP request. This can be realized by transparently processing the host language HTTP request, that is, the host language HTTP request is directly sent to the server without any processing.

According to another embodiment of the present invention, the system 300 for testing a browser-based application further comprises a response obtainer (not shown in FIG. 3) configured to obtain a response to the received host language HTTP request and a response to the target language HTTP request. In response to instructing the host language browser to issue the host language HTTP request, and the target language browser to issue the target language HTTP request, the host language browser will receive a response to the host language HTTP request and display it on the host language browser, and the target language browser will receive a response to the target language HTTP request and display it on the target language browser. The response obtainer obtains the response to the received host language HTTP request and the response to the target language HTTP request by invoking the interfaces provided by the browsers. Further, according to another embodiment of the present invention, the system 300 for testing a browser-based application further comprises a comparison analyzer configured to compare and analyze the response to the received host language HTTP request and the response to the target language HTTP request.

Above has been described the basic principles of the present invention with reference to specific embodiments. However, it should be pointed out that those of ordinary skills in the art can appreciate that all or any steps or components of the method and apparatus of the present disclosure can be realized in hardware, software or a combination thereof in any computing devices (including processors, storage mediums, etc.) or a network of computing devices. And this can be realized by those of ordinary skills in the art by using their basic programming skills after reading the description of the present invention.

Therefore, the objectives of the present disclosure can be realized by running one program or a set of programs on any computing device. The computing device can be a well-known general-purpose device. Therefore, the objectives of the present invention can also be realized by merely providing a program product containing the program code realizing the method or the apparatus. That is to say, such a program product also forms the present invention, and the storage medium storing such a program product also forms the present invention. Obviously, the storage medium can be any well-known storage medium or any storage medium to be developed in the future.

It should also be pointed out that in the apparatus and method of the present invention, obviously the respective parts or steps may be split and/or recombined. Such splitting and/or recombination should be viewed as equivalent solutions of the present disclosure. Moreover, the steps of the above series of processing can be performed naturally according to the described sequence and in the order of time, but they are not necessarily executed in the order of time. Some steps can be performed in parallel or independent from each other.

Although the present invention and its advantages have been described in great detail, it should be understood that various changes, replacement and variations can be made without departing from the spirit and scope of the present disclosure defined by the appended claims. Moreover, the terms, "comprise", "include" or any other variants, in the present application are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the sentence "comprising a . . . " does not exclude the condition that there are other same elements in the process, method, article or apparatus including the element.

What is claimed is:

1. A method for testing multiple language versions of a browser-based application, said method comprising:
   a processor of a computer system receiving a host language Hypertext Transfer Protocol (HTTP) request issued by a host language browser, said host language HTTP request configured to be sent to a host server address, said host language HTTP request comprising a plurality of parameter strings in a host language;
   said processor determining, from a direct correspondence between the host language and the target language specified in globalization rules, a target language corresponding to the host language and differing from the host language, said processor generating a target language HTTP request by replacing each host parameter string of at least one host parameter string of the plurality of parameter strings in the received HTTP request with a respective target parameter string associated with the target language, said generated target language HTTP request configured to be sent to a target server address associated with and different from the host server address;
replacing each host parameter string of the at least one host parameter string in the host language HTTP request with the respective target parameter string determined from the globalization rules.

2. The method of claim 1, said method further comprising:
   said processor instructing a target language browser to send the target language HTTP request to the target server address; and
   said processor instructing the host language browser to send the host language HTTP request to the host server address.

3. The method of claim 2, wherein said instructing the target language browser and said instructing the host language browser comprise directing the target language browser and the host language browser to concurrently send the target language HTTP request to the target server address and the host language HTTP request to the host server address.

4. The method of claim 2, said method further comprising:
   said processor obtaining a response to the host language HTTP request in response to said host language browser sending the host language HTTP request to the host server address;
   said processor obtaining a response to the target language HTTP request in response to said target language browser sending the target language HTTP request to the target server address;
   said processor comparing and analyzing the obtained response to the host language HTTP request and the obtained response to the target language HTTP request.

5. The method of claim 1, wherein the globalization rules specify a correspondence between host parameter strings in the host language and corresponding target parameter strings associated with the target language, and wherein said generating the target language HTTP request comprises:
   determining from the globalization rules of correspondence between host parameter strings in the host language and corresponding target parameter strings associated with the target language: the respective target parameter string corresponding to each host parameter string of the at least one host parameter string in the host language HTTP request; and
   replacing each host parameter string of the at least one host parameter string in the host language HTTP request with the respective target parameter string determined from the globalization rules.

6. The method of claim 5, wherein a host address parameter string of the at least one host parameter string in the host language HTTP request is the host server address, and wherein the globalization rules specify that the target server address is the respective target parameter string corresponding to the host address parameter string.

7. The method of claim 5, wherein a date format parameter string of the at least one host parameter string in the host language HTTP request specifies a format for a month, day, and year of a date.

8. The method of claim 5, wherein a host language parameter string of the at least one host parameter string in the host language HTTP request is the host language, and wherein the globalization rules specify that the target language is the respective target parameter string corresponding to the host language parameter string.

9. A computer system comprising a processor, a memory coupled to the processor, and a computer readable hardware storage device coupled to the processor, said storage device containing program code configured to be executed by the processor via the memory to implement a method for testing multiple language versions of a browser-based application, said method comprising:
   said processor receiving a host language Hypertext Transfer Protocol (HTTP) request issued by a host language browser, said host language HTTP request configured to be sent to a host server address, said host language HTTP request comprising a plurality of parameter strings in a host language;
   said processor determining, from a direct correspondence between the host language and the target language specified in globalization rules, a target language corresponding to the host language and differing from the host language; and
   after said determining the target language, said processor generating a target language HTTP request by replacing each host parameter string of at least one host parameter string of the plurality of parameter strings in the received HTTP request with a respective target parameter string associated with the target language, said generated target language HTTP request configured to be sent to a target server address associated with and different from the host server address.

10. The computer system of claim 9, said method further comprising:
    said processor instructing a target language browser to send the target language HTTP request to the target server address; and
    said processor instructing the host language browser to send the host language HTTP request to the host server address.

11. The computer system of claim 10, wherein said instructing the target language browser and said instructing the host language browser comprise directing the target language browser and the host language browser to concurrently send the target language HTTP request to the target server address and the host language HTTP request to the host server address.

12. The computer system of claim 10, said method further comprising:
said processor obtaining a response to the host language HTTP request in response to said host language browser sending the host language HTTP request to the host server address;
said processor obtaining a response to the target language HTTP request in response to said target language browser sending the target language HTTP request to the target server address;
said processor comparing and analyzing the obtained response to the host language HTTP request and the obtained response to the target language HTTP request.

13. The computer system of claim 9, wherein the globalization rules specify a correspondence between host parameter strings in the host language and corresponding target parameter strings associated with the target language, wherein said generating the target language HTTP request comprises:
determining from the globalization rules of correspondence between host parameter strings in the host language and corresponding target parameter strings associated with the target language: the respective target parameter string corresponding to each host parameter string of the at least one host parameter string in the host language HTTP request; and
replacing each host parameter string of the at least one host parameter string in the host language HTTP request with the respective target parameter string determined from the globalization rules.

14. The computer system of claim 13, wherein a host address parameter string of the at least one host parameter string in the host language HTTP request is the host server address, and wherein the globalization rules specify that the target server address is the respective target parameter string corresponding to the host address parameter string.

15. A computer program product, comprising a computer readable hardware storage device having a computer readable program code stored therein, said program code configured to be executed by a processor of a computer system to implement a method for testing multiple language versions of a browser-based application, said method comprising:
said processor receiving a host language Hypertext Transfer Protocol (HTTP) request issued by a host language browser, said host language HTTP request configured to be sent to a host server address, said host language HTTP request comprising a plurality of parameter strings in a host language;
said processor determining, from a direct correspondence between the host language and the target language specified in globalization rules, a target language corresponding to the host language and differing from the host language; and
after said determining the target language, said processor generating a target language HTTP request by replacing each host parameter string of at least one host parameter string of the plurality of parameter strings in the received HTTP request with a respective target parameter string associated with the target language, said generated target language HTTP request configured to be sent to a target server address associated with and different from the host server address.

16. The computer program product of claim 15, said method further comprising:
said processor instructing a target language browser to send the target language HTTP request to the target server address; and
said processor instructing the host language browser to send the host language HTTP request to the host server address.

17. The computer program product of claim 16, wherein said instructing the target language browser and said instructing the host language browser comprise directing the target language browser and the host language browser to concurrently send the target language HTTP request to the target server address and the host language HTTP request to the host server address.

18. The computer program product of claim 16, said method further comprising:
said processor obtaining a response to the host language HTTP request in response to said host language browser sending the host language HTTP request to the host server address;
said processor obtaining a response to the target language HTTP request in response to said target language browser sending the target language HTTP request to the target server address;
said processor comparing and analyzing the obtained response to the host language HTTP request and the obtained response to the target language HTTP request.

19. The computer program product of claim 15, wherein the globalization rules specify a correspondence between host parameter strings in the host language and corresponding target parameter strings associated with the target language, wherein said generating the target language HTTP request comprises:
determining from the globalization rules of correspondence between host parameter strings in the host language and corresponding target parameter strings associated with the target language: the respective target parameter string corresponding to each host parameter string of the at least one host parameter string in the host language HTTP request; and
replacing each host parameter string of the at least one host parameter string in the host language HTTP request with the respective target parameter string determined from the globalization rules.

20. The computer program product of claim 19, wherein a host address parameter string of the at least one host parameter string in the host language HTTP request is the host server address, and wherein the globalization rules specify that the target server address is the respective target parameter string corresponding to the host address parameter string.

* * * * *